United States Patent
Omura et al.

(10) Patent No.: US 9,830,281 B2
(45) Date of Patent: Nov. 28, 2017

(54) SEMICONDUCTOR DEVICE AND ELECTRONIC DEVICE

(71) Applicant: Renesas Electronics Corporation, Tokyo (JP)

(72) Inventors: Kenichiro Omura, Tokyo (JP); Ryohei Yoshida, Tokyo (JP); Takanobu Naruse, Tokyo (JP); Seiichi Saito, Tokyo (JP)

(73) Assignee: Renesas Electronics Corporation, Tokyo (JP)

( * ) Notice: Subject to any disclaimer, the term of this patent is extended or adjusted under 35 U.S.C. 154(b) by 90 days.

(21) Appl. No.: 14/083,608

(22) Filed: Nov. 19, 2013

(65) Prior Publication Data
US 2014/0189259 A1   Jul. 3, 2014

(30) Foreign Application Priority Data

Dec. 28, 2012   (JP) .................................. 2012-287269

(51) Int. Cl.
 G06F 13/12    (2006.01)
 G06F 13/16    (2006.01)
 G06F 12/0813  (2016.01)

(52) U.S. Cl.
 CPC ...... *G06F 13/1663* (2013.01); *G06F 12/0813* (2013.01)

(58) Field of Classification Search
 CPC .................................................. G06F 11/108
 See application file for complete search history.

(56) References Cited

U.S. PATENT DOCUMENTS

| 5,761,731 | A  | * | 6/1998 | Van Doren et al. .......... 711/155 |
| 6,845,426 | B2 | * | 1/2005 | Kuwata ................. G06F 3/0613 |
|           |    |   |        | 711/113 |
| 2008/0071996 | A1 | * | 3/2008 | Ohmori ............... G06F 13/4022 |
|           |    |   |        | 711/148 |
| 2009/0119720 | A1 | * | 5/2009 | Deuel et al. ..................... 725/75 |
| 2012/0005396 | A1 |   | 1/2012 | Sargeant et al. |

FOREIGN PATENT DOCUMENTS

| JP | 2008-171432 A | 7/2008 |
| JP | 2009-128313 A | 6/2009 |

* cited by examiner

*Primary Examiner* — Henry Tsai
*Assistant Examiner* — Juanito Borromeo
(74) *Attorney, Agent, or Firm* — Shapiro, Gabor and Rosenberger, PLLC

(57) ABSTRACT

A semiconductor device includes a first memory controller configured to output a first control signal to first and second external memories through a first memory interface, a second memory controller configured to output a second control signal to the second external memory through a second memory interface, an inter-device interface for communicating with another semiconductor device, terminals configured to output the second control signal that has passed through the second memory interface, and a first selector configured to select between the second memory interface and the inter-device interface in accordance with an operation mode of the semiconductor device and to couple the selected interface to the terminals.

14 Claims, 12 Drawing Sheets

SEMICONDUCTOR DEVICE AND ELECTRONIC DEVICE

CROSS-REFERENCE TO RELATED APPLICATIONS

This application is based upon and claims the benefit of priority from Japanese patent application No. 2012-287269, filed on Dec. 28, 2012, the disclosure of which is incorporated herein in its entirety by reference.

BACKGROUND

The present invention relates to a semiconductor device and electronic device and, for example, to a semiconductor device and electronic device which are suitable for car navigation systems or the like.

Car navigation systems including multiple monitors have been developed in recent years. Such a car navigation system controls image display on the monitors on the basis of a program or various types of data stored in a memory.

Japanese Unexamined Patent Application Publication No. 2008-171432 discloses a configuration that synchronously controls multiple memory controllers coupled to memories using a synchronous circuit. Japanese Unexamined Patent Application Publication No. 2009-128313 discloses the configuration of a car navigation system.

SUMMARY

The inventors have found various problems in the development of a semiconductor device used in an electronic device, such as a car navigation system. Embodiments disclosed in the present application provide semiconductor devices which are suitable for car navigation systems or the like.

Other problems and novel features will be apparent from the description of the present specification and the accompanying drawings.

A semiconductor device according to one embodiment includes a selector configured to select between a memory interface and an inter-device interface in accordance with an operation mode of the semiconductor device and to couple the selected interface to terminals.

According to the one embodiment, it is possible to provide a good-quality semiconductor device which is suitable for electronic devices, such as car navigation systems.

BRIEF DESCRIPTION OF THE DRAWINGS

The above and other aspects, advantages and features will be more apparent from the following description of certain embodiments taken in conjunction with the accompanying drawings, in which.

DETAILED DESCRIPTION

Figure 1:
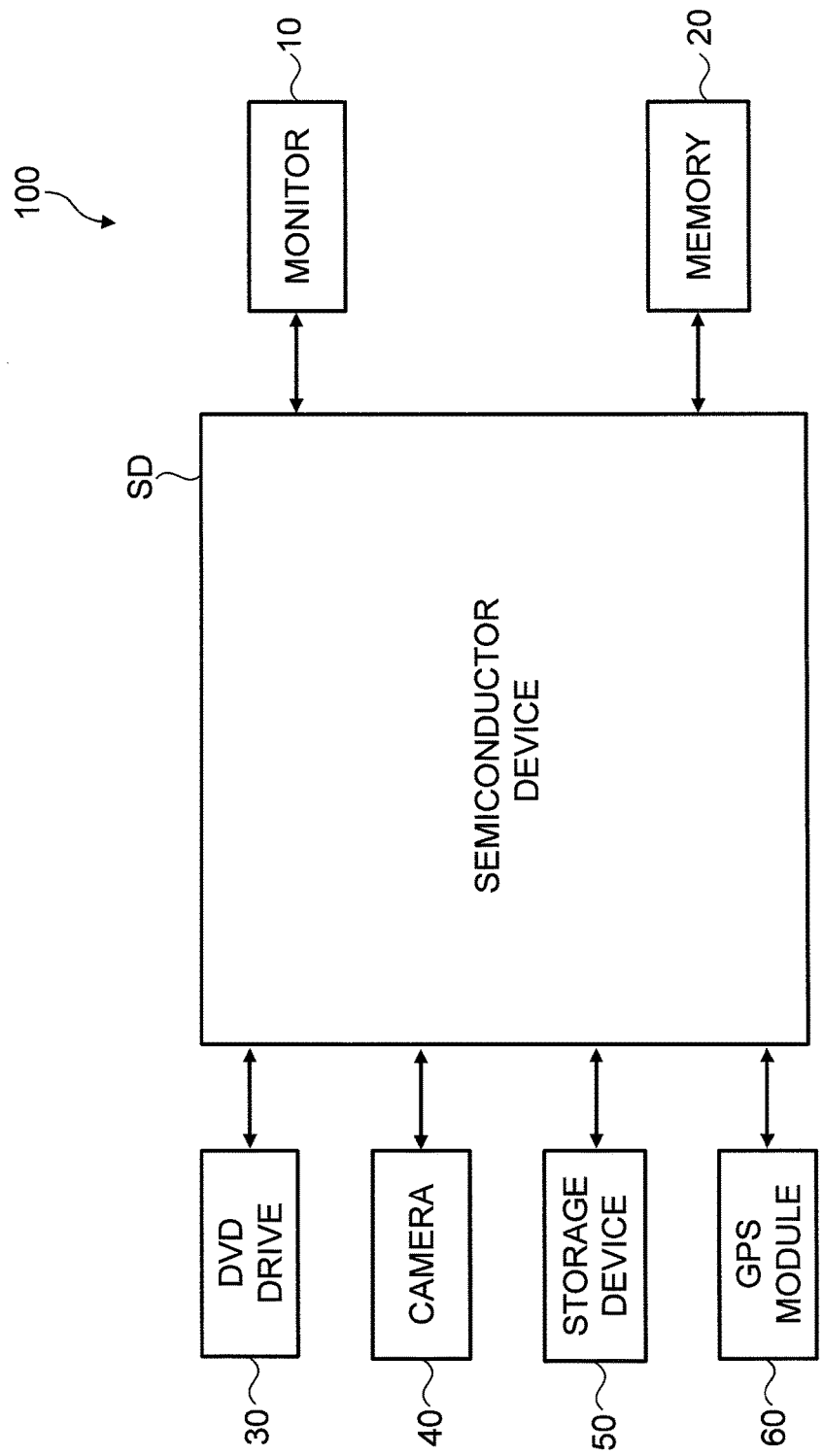
FIG. 1 is a block diagram showing an example configuration of an electronic device 100 according to the first embodiment.

Now, specific embodiments will be described in detail with reference to the accompanying drawings. However, the embodiments are not restrictive. To clarify the description, simplified descriptions or drawings are shown as necessary.
First Embodiment
Configuration of Electronic Device First, referring to FIG. 1, there will be described the configuration of an electronic device to which a semiconductor device according to a first embodiment is applied. FIG. 1 is a block diagram showing an example configuration of an electronic device 100 according to the first embodiment. Hereafter, there will be described an example in which the electronic device 100 is a car navigation system to be mounted on an automobile. As shown in FIG. 1, the electronic device 100 includes a semiconductor device SD, a monitor 10, a memory 20, a digital versatile disc (DVD) drive 30, a camera 40, a storage device 50, and a global positioning system (GPS) module 60.

The semiconductor device SD controls the monitor 10, the memory 20, the DVD drive 30, the camera 40, the storage device 50, and the GPS module 60. The semiconductor device SD shown in FIG. 1 may include a single chip or multiple chips. For example, if the monitor 10 includes multiple monitors, the semiconductor device SD also includes multiple chips. The internal configuration of the semiconductor device SD according to the first embodiment will be described in detail with reference to FIG. 5 later.

The monitor 10 is a display device, such as a liquid crystal display (LCD) or organic light-emitting diode (OLED) display. The monitor 10 displays navigation images, as well as images stored in a DVD inserted into the DVD drive 30, images captured by the camera 40, or the like. Switching of the image displayed by the monitor 10 is controlled by the semiconductor device SD. If the monitor 10 includes multiple monitors, it is possible, for example, to display navigation images to the monitor of the driver's seat and to display images (e.g., movie) of a DVD to the monitor of the passenger seat or rear seat. That is, the multiple monitors can display different images.

The memory (external memory) 20 is storing programs and data used by the semiconductor device SD. Often used as the memory 20 is a dynamic random access memory (DRAM), which is a volatile memory, where stored data is erased when power is shut off. Of course, a non-volatile memory, where stored data is held when power is shut off, may be used as the memory 20.

The DVD drive 30 reads images stored in a DVD. The images of a DVD inserted into the DVD drive 30 are output from the monitor 10.

The camera 40 is, for example, a so-called rear view camera, which is mounted on the rear of an automobile. The camera 40 captures images of the rear of an automobile, which becomes a blind spot from the driver's seat when the automobile moves back. The images captured by the camera 40 are output from the monitor 10. For example, while an automobile moves back (is placed in reverse gear), images captured by the camera 40 are displayed on the monitor 10 of the driver's seat.

The storage device 50 is preferably a mass-storage device, such as a hard disk, and is storing navigation images (map information).

The GPS module 60 includes an antenna, an RF circuit, and a base-band circuit. Based on position information received from an artificial satellite, the GPS module 60 outputs the current position of the automobile to the semiconductor device SD.

Configuration of Semiconductor Device According to First Comparative Example

Figure 2:
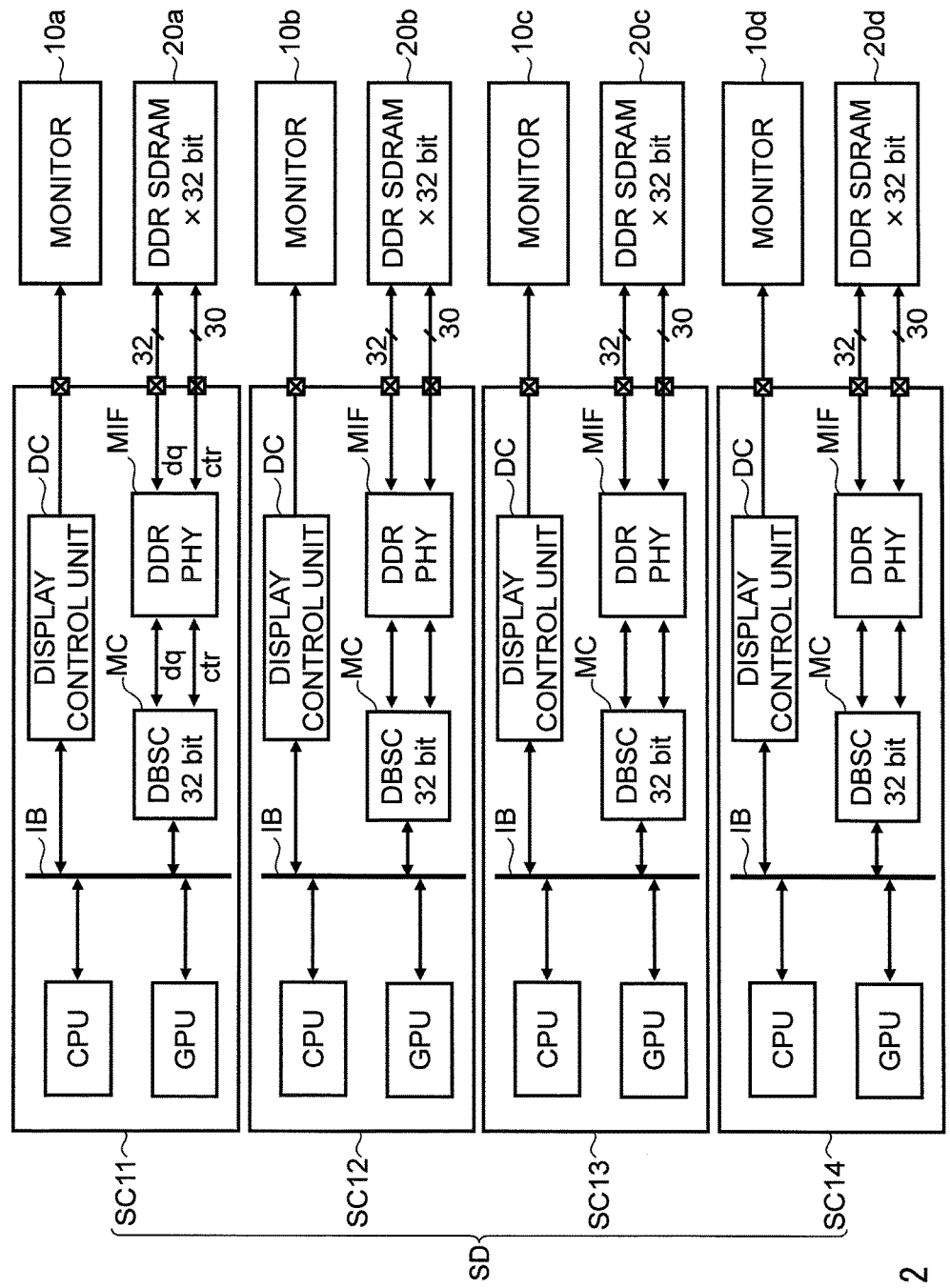
FIG. 2 is a block diagram showing an example configuration of the semiconductor device SD according to the first comparative example.

Next, referring to FIG. 2, there will be described a semiconductor device SD according to a first comparative example examined by the inventors. FIG. 2 is a block diagram showing an example configuration of the semiconductor device SD according to the first comparative example. FIG. 2 shows the internal configuration of the semiconductor device SD according to the first comparative example, as well as four monitors, 10a to 10d, and four memories, 20a to 20d. The four monitors, 10a to 10d, correspond to the monitor 10 of FIG. 1, and the four memories, 20a to 20d, correspond to the memory 20 of FIG. 1. In an example of FIG. 2, all the memories, 20a to 20d, are 32-bit bus width double-data-rate synchronous dynamic random access memories (DDR SDRAMs).

As shown in FIG. 2, the semiconductor device SD according to the first comparative example includes four semiconductor chips, SC11 to SC14. Since the four semiconductor chips, SC11 to SC14, have similar configurations, only the semiconductor chip SC11 will be described.

As shown in FIG. 2, the semiconductor chip SC11 includes a central processing unit (CPU), a graphics processing unit GPU, a display control unit DC, a memory controller MC, a memory interface MIF, and an internal bus IB. The CPU, the graphics processing unit GPU, the display control unit DC, and the memory controller MC are coupled together through the internal bus IB.

The CPU accesses the memory 20a through the memory controller MC and the memory interface MIF. The CPU requests the display control unit DC to, for example, start displaying images on the monitor 10a or change the displayed image to another.

The graphics processing unit GPU is an operation circuit specialized in graphics rendering. Images rendered by the graphics processing unit GPU are displayed on the monitor 10a through the display control unit DC.

The memory controller MC transmits a data signal dq and a control signal ctr to the memory interface MIF. The memory controller MC also transmits a data signal dq received from the memory interface MIF to the CPU or graphics processing unit GPU. In an example of FIG. 2, the memory 20a is 32-bit bus width DDR SDRAM and therefore the memory controller MC is composed of a DDR SDRAM bus state controller (DBSC) for a 32-bit bus width DDR SDRAM.

The memory interface MIF transmits the control signal ctr and data signal dq received from the memory controller MC to the memory 20a. The memory interface MIF also transmits a control signal ctr and a data signal dq received from the memory 20a to the memory controller MC. In the example of FIG. 2, the memory 20a and the memory interface MIF are coupled together through a 32-bit data signal bus and a 30-bit control signal bus.

As shown in FIG. 2, in the semiconductor device SD according to the first comparative example, the monitor 10a and the memory 20a are coupled to the semiconductor chip SC11. Similarly, the monitor 10b and the memory 20b are coupled to the semiconductor chip SC12; the monitor 10c and the memory 20c to the semiconductor chip SC13; and the monitor 10d and the memory 20d to the semiconductor chip SC14. That is, a single monitor and a single memory are coupled to a single semiconductor chip. For this reason, the semiconductor device SD has a problem of an increased implementation area.

Configuration of Semiconductor Device According to Second Comparative Example

Figure 3:
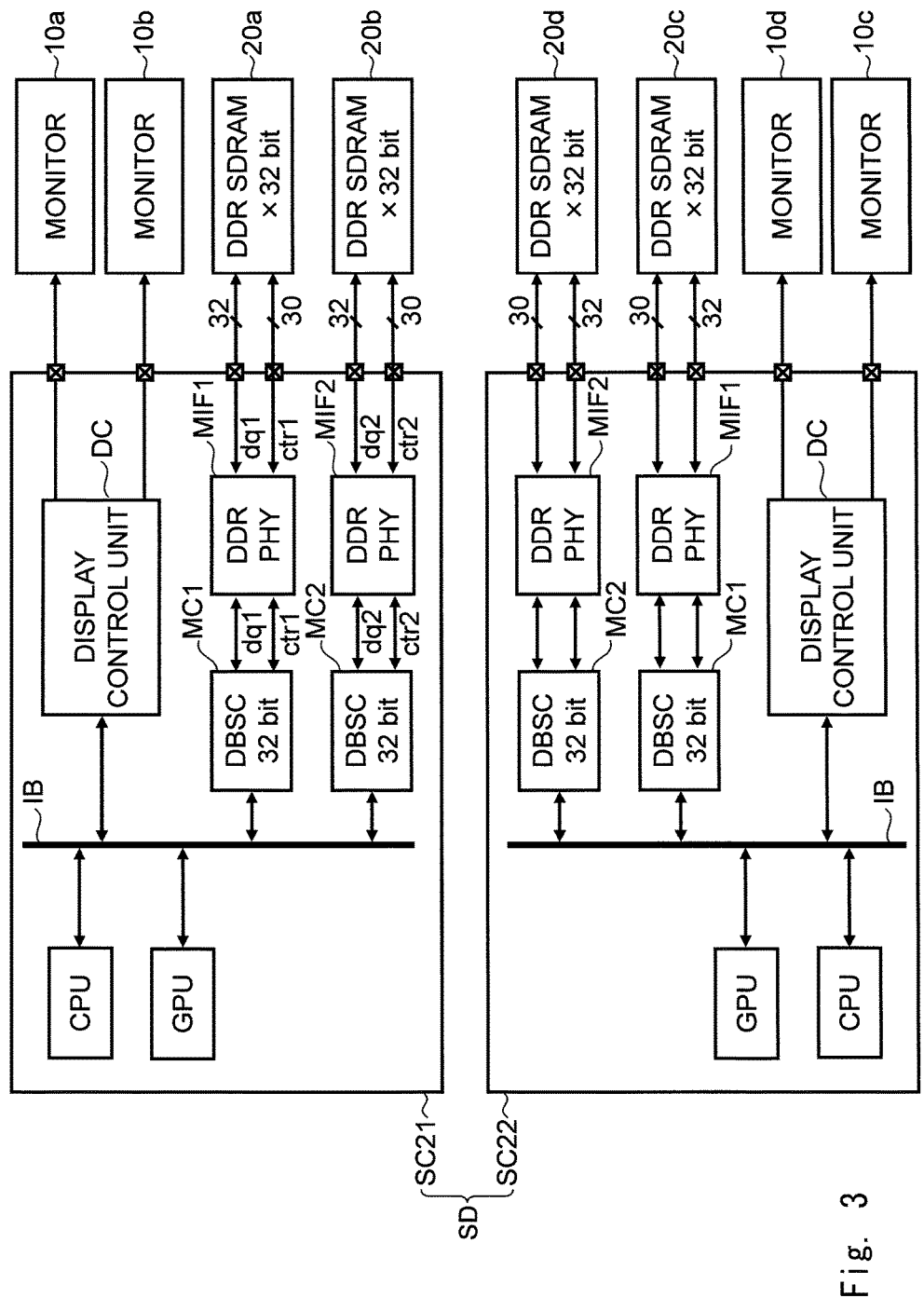
FIG. 3 is a block diagram showing an example configuration of the semiconductor device SD according to the second comparative example.

Next, referring to FIG. 3, there will be described a semiconductor device SD according to a second comparative example examined by the inventors. FIG. 3 is a block diagram showing an example configuration of the semiconductor device SD according to the second comparative example. As with FIG. 2, FIG. 3 shows the internal configuration of the semiconductor device SD according to the second comparative example, as well as four monitors, 10a to 10d, and four memories, 20a to 20d. The four monitors, 10a to 10d, correspond to the monitor 10 of FIG. 1, and the four memories, 20a to 20d, correspond to the memory 20 of FIG. 1. In an example of FIG. 3 also, all the memories, 20a to 20d, are 32-bit bus width DDR SDRAMs.

While the semiconductor device SD according to the first comparative example of FIG. 2 includes the four semiconductor chips, SC11 to SC14, the semiconductor device SD according to the second comparative example includes two semiconductor chips, SC21 and SC22. The two monitors, 10a and 10b, and the two memories, 20a and 20b, are coupled to the semiconductor chip SC21. The two monitors, 10c and 10d, and the two memories, 20c and 20d, are coupled to the semiconductor chip SC22. Since the two semiconductor chips, SC21 and SC22, have similar configurations, only the semiconductor chip SC21 will be described.

As shown in FIG. 3, the semiconductor chip SC21 includes a CPU, a graphics processing unit GPU, a display control unit DC, memory controllers MC1 and MC2, memory interfaces MIF1 and MIF2, and an internal bus IB. The two monitors, 10a and 10b, are coupled to the display control unit DC. The memory 20a is coupled to the memory interface MIF1, and a control signal ctr1 and a data signal dq1 are transmitted or received between both. The memory 20b is coupled to the memory interface MIF2, and a control signal ctr2 and a data signal dq2 are transmitted or received between both.

Since the semiconductor chip SC11 shown in FIG. 2 includes only the single set of memory controller MC and memory interface MIF, only the single memory, 20a, is coupled to the semiconductor chip SC11. Further, only the single monitor, 10a, is coupled to the semiconductor chip SC11. On the other hand, the semiconductor chip SC21 shown in FIG. 3 includes the two sets of memory controller, MC1 and MC2, and memory interface, MIF2 and MIF2.

Accordingly, the two memories, 20a and 20b, are coupled to the semiconductor chip SC21. Further, the two monitors, 10a and 10b, are coupled to the semiconductor chip SC21. The other configuration is similar to that of the semiconductor chip SC11 according to the first comparative example and therefore will not be described.

As seen above, the semiconductor device SD according to the second comparative example, which includes the two semiconductor chips, SC21 and SC22, can reduce the implementation area compared to the semiconductor device SD according to the first comparative example, which includes the four semiconductor chips, SC11 to SC14.

Configuration of Semiconductor Device According to Third Comparative Example

Figure 4:
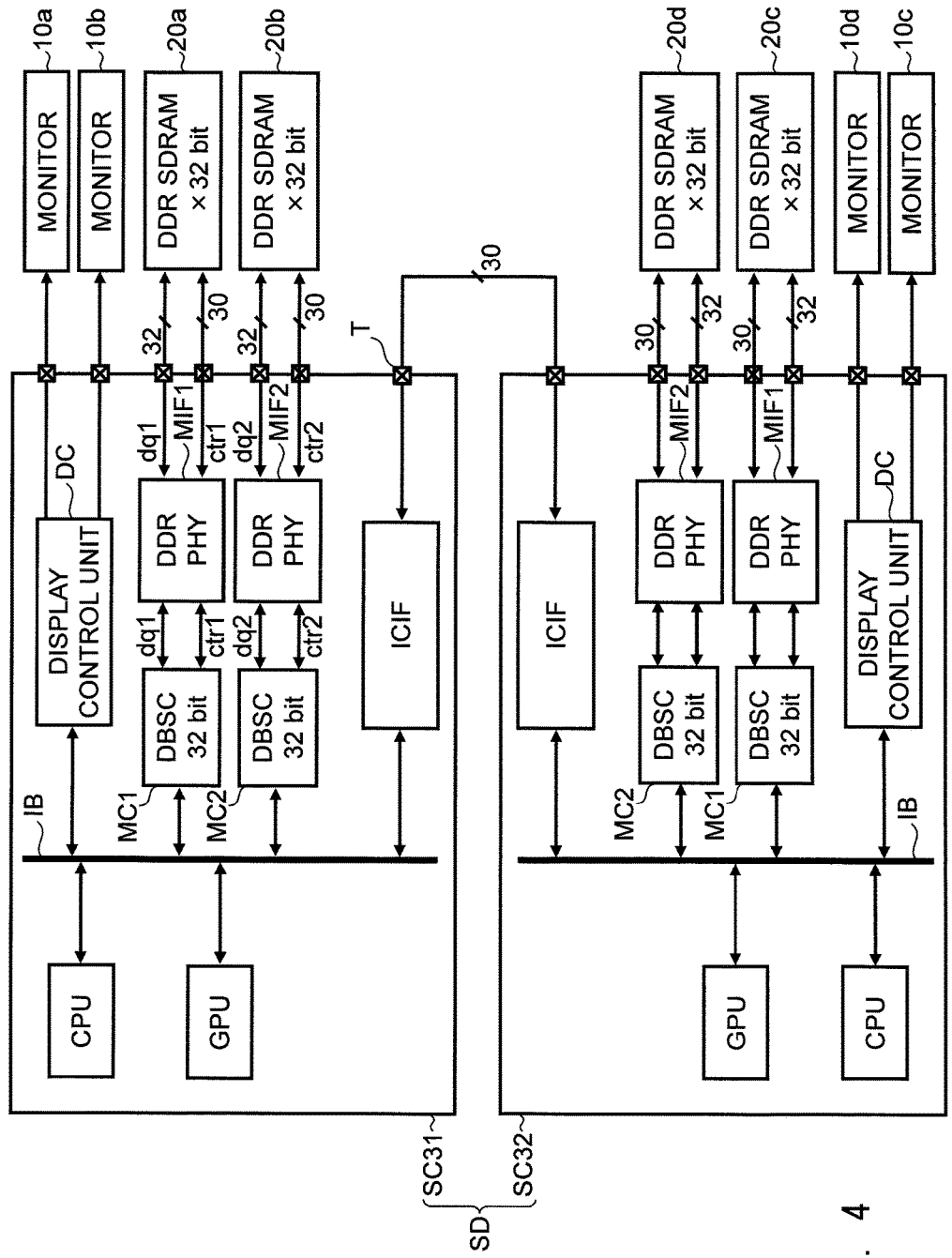
FIG. 4 is a block diagram showing an example configuration of the semiconductor device SD according to the third comparative example.

Next, referring to FIG. 4, there will be described a semiconductor device SD according to a third comparative example examined by the inventors. FIG. 4 is a block diagram showing an example configuration of the semiconductor device SD according to the third comparative example. As with FIGS. 2 and 3, FIG. 4 shows the internal configuration of the semiconductor device SD according to the third comparative example, as well as four monitors, 10a to 10d, and four memories, 20a to 20d. The four monitors, 10a to 10d, correspond to the monitor 10 of FIG. 1, and the four memories, 20a to 20d, correspond to the memory 20 of FIG. 1. In an example of FIG. 3 also, all the memories, 20a to 20d, are 32-bit bus width DDR SDRAMs.

As shown in FIG. 4, the semiconductor device SD according to the third comparative example includes two semiconductor chips, SC31 and SC32, as with the semiconductor device SD according to the second comparative example. The two monitors, 10a and 10b, and the two memories, 20a and 20b, are coupled to the semiconductor chip SC31. On the other hand, the two monitors, 10c and 10d, and the two memories, 20c and 20d, are coupled to the semiconductor chip SC32. Since the two semiconductor chips, SC31 and SC32, have similar configurations, only the semiconductor chip SC31 will be described.

As shown in FIG. 4, the semiconductor chip SC31 includes a CPU, a graphics processing unit GPU, a display control unit DC, memory controllers MC1 and MC2, memory interfaces MIF1 and MIF2, an internal bus IB, and an inter-chip interface ICIF. That is, the semiconductor chip SC31 includes the inter-chip interface ICIF as well as the configuration of the semiconductor chip SC21 shown in FIG. 3.

The inter-chip interface ICIF is coupled to the internal bus IB. The inter-chip interface ICIF of the semiconductor chip SC31 is coupled to the inter-chip interface ICIF of the semiconductor chip SC32 through a 30-bit bus. Accordingly, the CPU of the semiconductor chip SC31 also can control the monitors 10c and 10d and the two memories, 20c and 20d, coupled to the semiconductor chip SC32. Of course, the CPU of the semiconductor chip SC32 also can control the monitors 10a and 10b and the two memories, 20a and 20b, coupled to the semiconductor chip SC31.

As seen above, in the semiconductor device SD according to the third comparative example, the semiconductor chips SC31 and SC32 are coupled together through the inter-chip interfaces ICIF included therein. Accordingly, either semiconductor chip can control the four monitors, 10a to 10d, and the four memories, 20a to 20d. Thus, the control is facilitated. On the other hand, it is necessary to add terminals T solely for inter-chip communication, which would result in an increase in the number of terminals. In an example of FIG. 4, 30 terminals T must be added.

The inventors have contemplated of controlling an increase in the number of terminals of a semiconductor device which includes inter-chip interfaces and where multiple semiconductor chips can be coupled together. Details of the contemplation will be described below.

Configuration of Semiconductor Device According to First Embodiment

Figure 5:
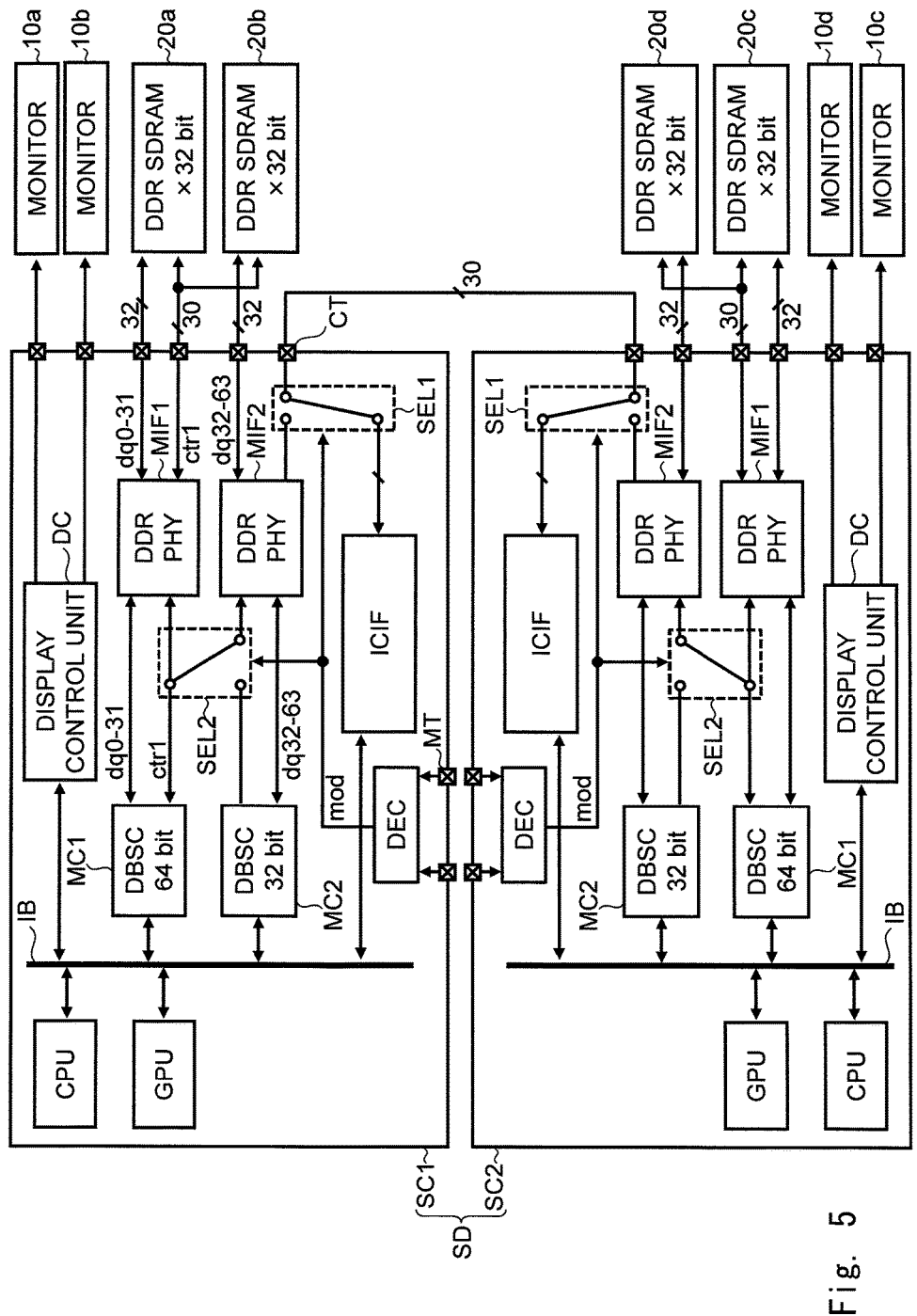
FIG. 5 is a block diagram showing an example configuration of the semiconductor device SD according to the first embodiment.

Next, referring to FIG. 5, a semiconductor device SD according to a first embodiment will be described. FIG. 5 is a block diagram showing an example configuration of the semiconductor device SD according to the first embodiment. FIG. 5 shows the internal configuration of the semiconductor device SD according to the first embodiment, as well as four monitors, 10a to 10d, and four memories, 20a to 20d. The four monitors, 10a to 10d, correspond to the monitor 10 of FIG. 1, and the four memories, 20a to 20d, correspond to the memory 20 of FIG. 1. In an example of FIG. 5, all the memories, 20a to 20d, are 32-bit bus width DDR SDRAMs. Note that the specific values of the bus width and the like are illustrative only and can be changed as appropriate, as a matter of course.

As shown in FIG. 5, the semiconductor device SD according to the first embodiment includes two semiconductor chips, SC1 and SC2. Coupled to the semiconductor chip SC1 are two monitors, 10a and 10b, and two memories, 20a and 20b. Coupled to the semiconductor chip SC2 are two monitors, 10c and 10d, and two memories, 20c and 20d. The semiconductor chips SC1 and SC2 are coupled together through inter-chip interfaces included therein. Accordingly, either semiconductor chip can control the four monitors, 10a to 10d, and the four memories, 20a to 20d. Since the two semiconductor chips, SC1 and SC2, have similar configurations, only the semiconductor chip SC1 will be described.

As shown in FIG. 5, the semiconductor chip SC1 includes a CPU, a graphics processing unit GPU, a display control unit DC, memory controllers MC1 and MC2, memory interfaces MIF1 and MIF2, an internal bus IB, an inter-chip interface ICIF, selectors SEL1 and SEL2, mode terminals MT, and a decoder DEC. The CPU, the graphics processing unit GPU, the display control unit DC, the memory controller MC, and the inter-chip interface ICIF are coupled together through the internal bus IB. Coupled to the display control unit DC are the two monitors, 10a and 10b. Coupled to the memory interfaces MIF1 and MIF2 are the memories 20a and memory 20b, respectively.

The CPU performs various processes in the semiconductor chip SC1 on the basis of a control program. The control program is stored in, for example, the memory 20a or memory 20b. The CPU accesses the memory 20a through the memory controller MC1 and the memory interface MIF1. Specifically, the CPU requests the memory controller MC1 to access the memory 20a. Similarly, the CPU accesses the memory 20b through the memory controller MC2 and the memory interface MIF2.

The CPU also can access the memory 20c through the inter-chip interface ICIF, as well as the inter-chip interface ICIF, the memory controller MC1, and the memory interface MIF1 of the semiconductor chip SC2. Similarly, the CPU also can access the memory 20d through the inter-chip interface ICIF, as well as the inter-chip interface ICIF, the memory controller MC2, and the memory interface MIF2 of the semiconductor chip SC2.

The CPU requests the display control unit DC to, for example, start displaying images or change the displayed image on the monitor 10a or monitor 10b. Through the inter-chip interface ICIF, as well as the inter-chip interface ICIF of the semiconductor chip SC2, the CPU also can request the display control unit DC of the semiconductor chip SC2 to, for example, start displaying images on the monitor 10c or monitor 10d or change the displayed image to another.

The CPU also requests the graphics processing unit GPU to render graphics.

The graphics processing unit GPU is an operation circuit specialized in graphics rendering. In accordance with a request from the CPU, the graphics processing unit GPU renders graphics, for example, using a program or data stored in the memory 20a or memory 20b. The graphics rendered by the graphics processing unit GPU are displayed on the monitor 10a through the display control unit DC.

In accordance with a request from the CPU or graphics processing unit GPU, the memory controller MC1 transmits 32-bit data signals dq0 to dq31 and a control signal ctr1 to the memory interface MIF1. The memory controller MC1 also transmits 32-bit data signals dq0 to dq31 received from the memory interface MIF1 to the CPU or graphics processing unit GPU.

The control signal ctr1 transmitted by the memory controller MC1 according to the first embodiment is also received by the memory interface MIF2 through the selector SEL2. That is, the memory controller MC1 according to the first embodiment controls both the memories 20a and 20b through the memory interfaces MIF1 and MIF2.

In an example of FIG. 5, both the memories 20a and 20b, coupled to the memory controller MC1 through the memory interfaces MIF1 and MIF2, are 32-bit bus width DDR SDRAMs. Accordingly, the memory controller MC1 is composed of a DDR SDRAM bus state controller (DBSC) for a 64-bit bus width DDR SDRAM.

In accordance with a request from the CPU or graphics processing unit GPU, the memory controller MC2 transmits 32-bit data signals dq32 to dq63 to the memory interface MIF2. The memory controller MC2 also transmits data signals dq32 to dq63 received from the memory interface MIF2 to the CPU or graphics processing unit GPU. In this case, a control signal line between the memory controller MC2 and the memory interface MIF2 is previously split by the selector SEL2. Thus, the memory controller MC2 only transfers the data signals dq32 to dq63.

As will be described in detail later, by changing the setting of the mode terminals MT to switch the selectors SEL1 and SEL2, it is possible to change the operation mode of the semiconductor chip SC1. In the operation mode in which inter-chip communication is used (hereafter referred to as the inter-chip communication mode) shown in FIG. 5, the memory controller MC1 controls both the memories 20a and 20b and therefore the memory controller MC2 does not control the memory 20b.

Figure 6:
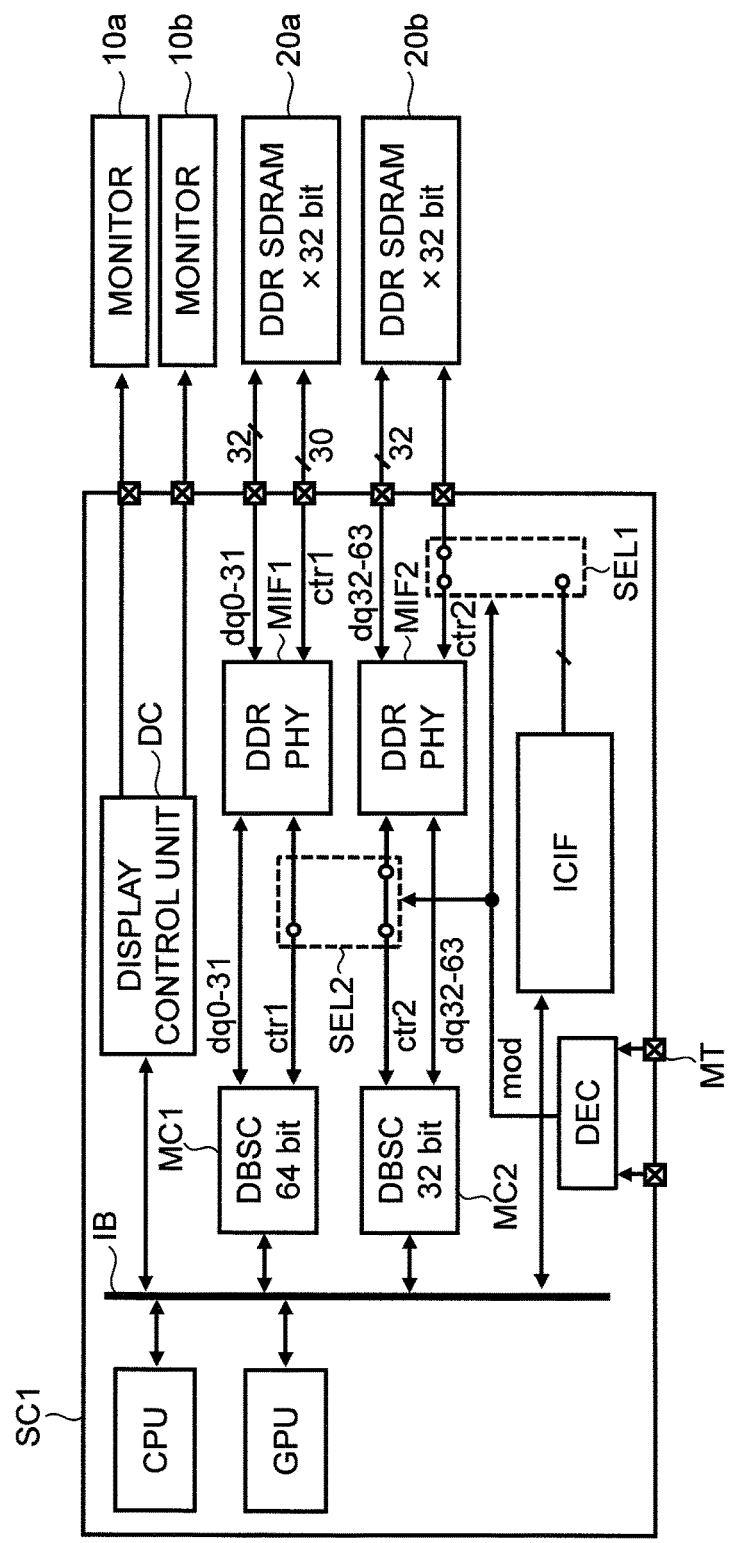
FIG. 6 is a block diagram of the semiconductor chip SC1 according to the first embodiment which is placed in the single mode.

Alternatively, an operation mode in which the semiconductor chip SC1 is used singly (hereafter referred to as the single mode) may be used. FIG. 6 is a block diagram of the semiconductor chip SC1 according to the first embodiment which is placed in the single mode. The selections made by the selectors SEL1 and SEL2 in FIG. 6 differ from the selections made thereby in FIG. 5. Specifically, as in FIG. 5, the control signal ctr1 output from the memory controller MC1 is input to the memory 20a through the memory interface MIF1. On the other hand, unlike in FIG. 5, a control signal ctr2 output from the memory controller MC2 is input to the memory 20b through the memory interface MIF2. That is, the memory controller MC1 controls the memory 20a, and the memory controller MC2 controls the memory 20b.

As seen above, in the single mode shown in FIG. 6, the memory controller MC2 controls the memory 20b, which is a 32-bit bus width DDR SDRAM. Accordingly, the memory controller MC2 is composed of a DDR SDRAM bus state controller (DBSC) for a 32-bit bus width DDR SDRAM.

Referring back to FIG. 5, the memory interface MIF1 sequentially outputs the control signal ctr1 and 32-bit data signals dq0 to dq31 received from the memory controller MC1 to the memory 20a. The memory interface MIF1 also transmits 32-bit data signals dq0 to dq31 received from the memory 20a to the memory controller MC. In the example of FIG. 5, the memory 20a and the memory interface MIF1 are coupled together through a 32-bit data signal bus and a 30-bit control signal bus.

The memory interface MIF2 sequentially outputs the 32-bit data signals dq32 to dq63 received from the memory controller MC2 to the memory 20b. The memory interface MIF2 also transmits 32-bit data signals dq32 to dq63 received from the memory 20b to the memory controller MC2. In the example of FIG. 5, the memory 20b and the memory interface MIF2 are coupled together through a 32-bit data signal bus.

Figure 7:
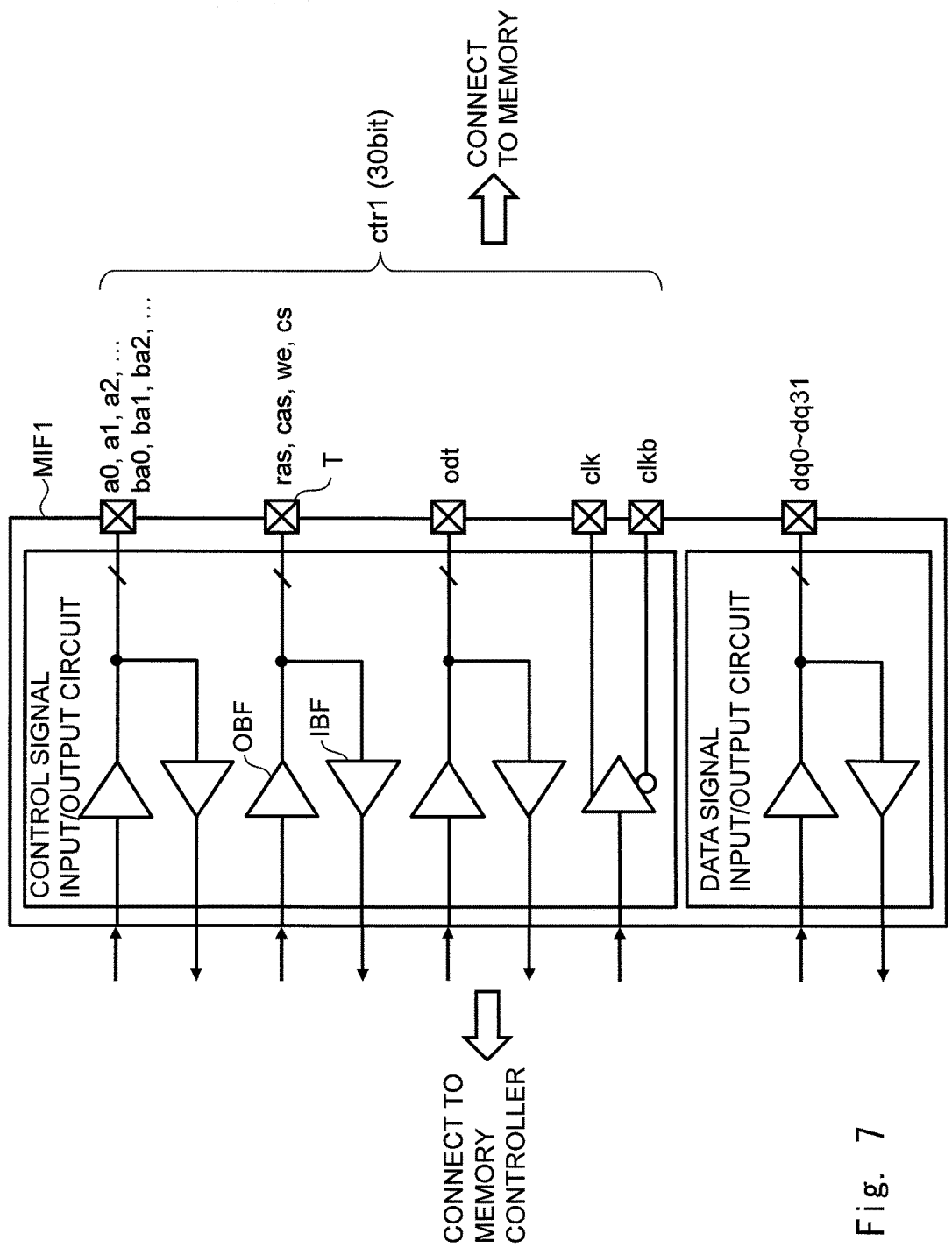
FIG. 7 is a circuit diagram showing the internal configuration of the memory interface MIF1.

Referring now to FIG. 7, the internal configuration of the memory interface MIF1 will be described. FIG. 7 is a circuit diagram showing the internal configuration of the memory interface MIF1. As shown in FIG. 7, the memory interface MIF1 includes a control signal input/output circuit and a data signal input/output circuit.

The control signal input/output circuit includes 28 sets of input buffer IBF and output buffer OBF and also includes one differential buffer. Each output buffer OBF amplifies the control signal ctr1 received from the memory controller MC1 and outputs the amplified signal to the memory 20a. Each input buffer IBF amplifies the control signal ctr1 received from the memory 20a and outputs the amplified signal to the memory controller MC1. The differential buffer differentially amplifies a clock signal received from the memory controller MC1 and outputs a clock signal clk and an inverted clock signal clkb.

As shown in FIG. 7, the 30-bit control signal ctr1 includes the clock signal clk and the inverted clock signal clkb, as well as address signals a0, a1, a2, and the like, bank address signals ba0, ba1, ba2, and the like, a row address strobe (RAS) signal ras, a column address strobe (CAS) signal cas, a write enable signal we, a chip select signal cs, an on die termination (ODT) signal odt, and the like.

On the other hand, the data signal input/output circuit includes 32 sets of input buffer IBF and output buffer OBF. Each output buffer OBF amplifies one of the data signals dq0 to dq31 received from the memory controller MC1 and outputs the amplified signal to the memory 20a. Each input buffer IBF amplifies one of the data signals dq0 to dq31 received from the memory 20a and outputs the amplified signal to the memory controller MC1.

Referring back to FIG. 5, description will be continued.

The inter-chip interface ICIF is coupled to the internal bus IB. The inter-chip interface ICIF of the semiconductor chip SC1 is coupled to the inter-chip interface ICIF of the semiconductor chip SC2 through the selector SEL1, the control terminal CT, and a 30-bit bus. Thus, the CPU of the semiconductor chip SC1 also can control the monitors 10c and 10d and the two memories, 20c and 20d, coupled to the semiconductor chip SC2. Of course, the CPU of the semiconductor chip SC2 also can control the monitors 10a and 10b and the two memories, 20a and 20b, coupled to the semiconductor chip SC1.

Figure 8:
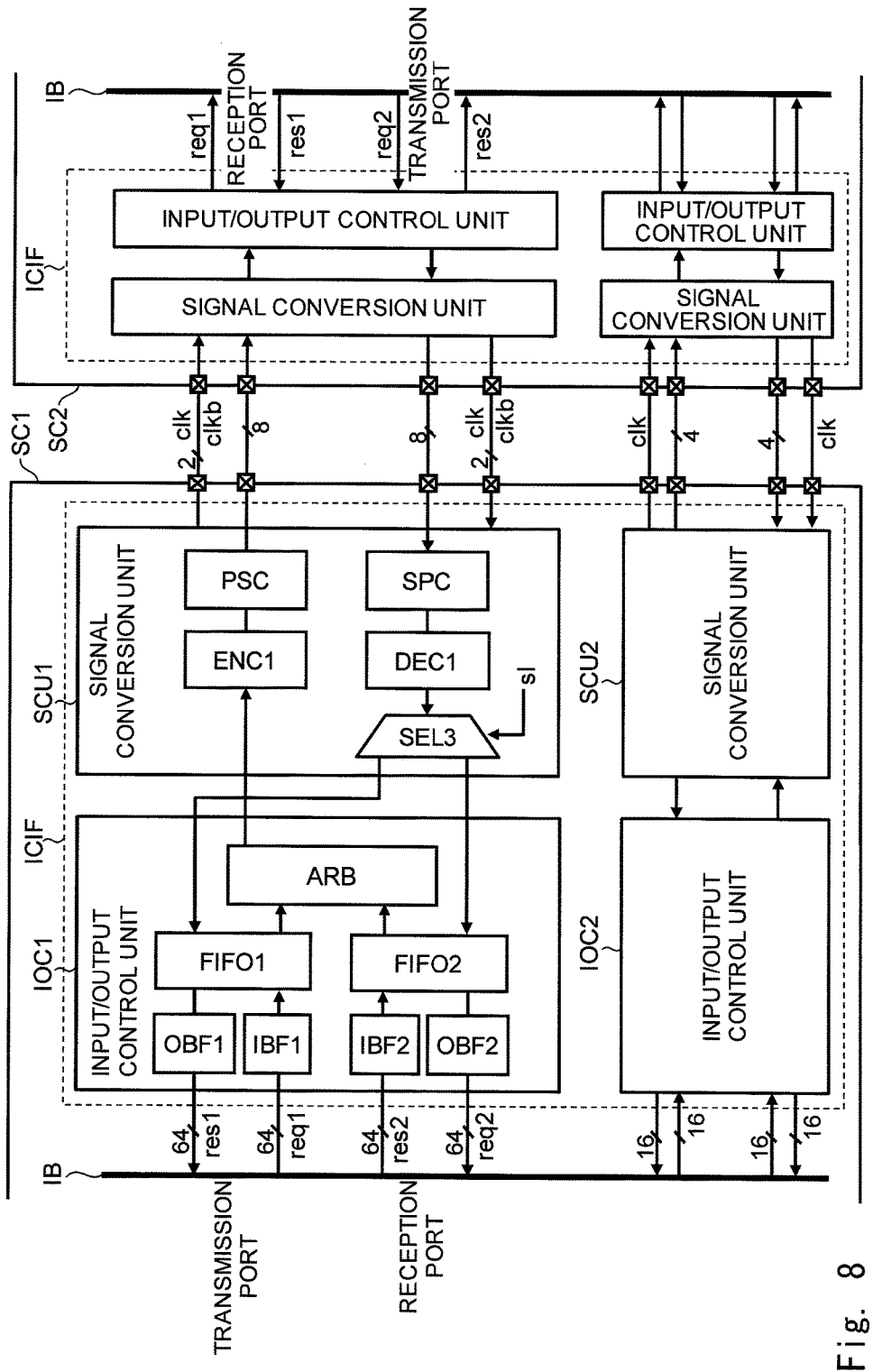
FIG. 8 is a block diagram showing the internal configuration of the inter-chip interface ICIF.

Referring now to FIG. 8, the internal configuration of the inter-chip interface ICIF will be described. FIG. 8 is a block diagram showing the internal configuration of the inter-chip interface ICIF. As shown in FIG. 8, the inter-chip interface ICIF of the semiconductor chip SC1 includes input/output control units IOC1 and IOC2 and signal conversion units SCU1 and SCU2. Since the input/output control units IOC1 and IOC2 have similar configurations, only the input/output control unit IOC1 will be described. Since the signal conversion units SCU1 and SCU2 also have similar configurations, only the signal conversion unit SCU1 will be described.

As shown in FIG. 8, the input/output control unit IOC1 includes two output buffers, OBF1 and OBF2, two input buffers, IBF1 and IBF2, two FIFO circuits, FIFO1 and FIFO2, and an arbiter ARB. The signal conversion unit SCU1 includes a selector SEL3, a decoder DEC1, an encoder ENC1, a serial/parallel conversion unit SPC, and a parallel/serial conversion unit PSC.

Hereafter, description will be made along the flow of signals.

A 64-bit request reg1 from a transmission port is input to the arbiter ARB through the input buffer IBF1 and the FIFO circuit FIFO1. On the other hand, a 64-bit response res2 from a reception port is input to the arbiter ARB through the input buffer IBF2 and the FIFO circuit FIFO2. When the request reg1 from the transmission port and the response res2 from the reception port compete with each other, the arbiter ARB selects one of these signals and outputs the selected signal to the encoder ENC1.

The 64-bit request reg1 or 64-bit response res2 input to the encoder ENC1 is compressed into an 8-bit signal and encoded by the encoder ENC1. The 8-bit request reg1 or 8-bit response res2, which is a parallel signal, is converted into a serial signal and output to the semiconductor chip SC2 by the parallel/serial conversion unit PSC. The 8-bit request reg1 or 8-bit response res2 input to the semiconductor chip SC2 is decompressed into a 64-bit signal and decoded. Subsequently, the 64-bit request reg1 is received through a reception port; the 64-bit response res2 is received through a transmission port.

On the other hand, a 64-bit request req2 transmitted through the transmission port of the semiconductor chip SC2 or a 64-bit res1 transmitted via the reception port of the semiconductor chip SC2 is compressed into an 8-bit signal and encoded by the inter-chip interface ICIF of the semiconductor chip SC2. The 8-bit request req2 or 8-bit response res1, which is a serial signal, is input to the serial/parallel conversion unit SPC of the semiconductor chip SC1 and converted into a parallel signal.

The 8-bit request req2 or 8-bit response res1 output from the serial/parallel conversion unit SPC is decompressed into a 64-bit signal and decoded by the decoder DEC1. The 64-bit request req2 or 64-bit response res1 is input to the selector SEL3. Based on a control signal s1, the selector SEL3 outputs the 64-bit request req2 to the FIFO circuit FIFO2 or outputs the 64-bit response res1 to the FIFO circuit FIFO1. Subsequently, the 64-bit request req2 is input to the reception port through the output buffer OBF2; the 64-bit response res1 is input to the transmission port through the output buffer OBF1.

As seen above, the transmission signals are compressed by the inter-chip interfaces ICIF of the semiconductor chips SC1 and SC2. Thus, the number of inter-chip communication terminals can be reduced. In an example of FIG. 10, the signal conversion unit SCU1 transmits or receives an 8-bit signal obtained by compressing a 64-bit signal, a clock signal clk (1 bit), and an inverted clock signal clkb (1 bit). That is, the signal conversion unit SCU1 transmits or receives the signals of 10 bits and therefore has 20 terminals. The signal conversion unit SCU2 transmits or receives a 4-bit signal obtained by converting a 16-bit signal, and a clock signal clk (1 bit). That is, the signal conversion unit SCU2 transmits or receives the signals of 5 bits and therefore has 10 terminals. Accordingly, the inter-chip interface ICIF of the semiconductor chip SC1 has a total of 30 inter-chip communication terminals.

The semiconductor device SD according to the first embodiment uses 30 control terminals CT for outputting control signals from the memory interface MIF2, as inter-chip interface terminals. As described above, the transmission signals are compressed by the inter-chip interfaces ICIF. Thus, it is possible to reduce the number of terminals necessary for inter-chip communication to the number of control terminals CT or less.

Referring back to FIG. 5, description will be continued.

Based on an operation mode signal mod from the decoder DEC, the selector (first selector) SEL1 changes the signal line coupled to the control terminal CT to another. Specifically, the selector SEL1 selects between a control signal line coupled to the memory interface MIF2 and a signal line coupled to the inter-chip interface ICIF and couples the selected signal line to the control terminal CT. In the operation mode of FIG. 5, the inter-chip interface ICIF is coupled to the control terminal CT.

Based on an operation mode signal mod from the decoder DEC, the selector (second selector) SEL2 changes the control signal line coupled to the memory interface MIF2 to another. Specifically, the selector SEL2 selects between a control signal line coupled to the memory controller MC1 and a control signal line coupled to the memory controller MC2 and couples the selected signal line to the memory interface MIF2. In other words, the selector SEL2 selects between a control signal ctr1 from the memory controller MC1 and a control signal ctr2 from the memory controller MC2 and inputs the selected control signal to the memory interface MIF2. In the inter-chip communication mode shown in FIG. 5, the control signal ctr1 from the memory controller MC1 is input to the memory interface MIF2.

The mode terminals MT are terminals for setting the operation mode. For example, in accordance with a set value corresponding to the operation mode, a value 1 (H: high) or value 0 (L: low) is assigned to each mode terminal MT. While the number of the mode terminals MT is two in the example of FIG. 5, the number of mode terminals MT is changed according to the number of operation modes as appropriate. For example, if the number of operation modes is two, a single mode terminal MT is sufficient. For example, if the number of operation modes is 4 or less, two mode terminals MT are sufficient. Generally, if the number of operation modes is $2^n$ or less, n (n is a natural number) number of mode terminals MT are sufficient. Note that the operation mode is determined in the design stage in principle and therefore cannot be changed after the semiconductor device SD is implemented. That is, the operation mode is not changed during operation of the semiconductor device SD.

The decoder DEC decodes the set value of the mode terminals MT to generate an operation mode signal mod. If the number of mode terminals MT is one (the number of operation modes is two), the decoder DEC is not needed.

Figure 9:
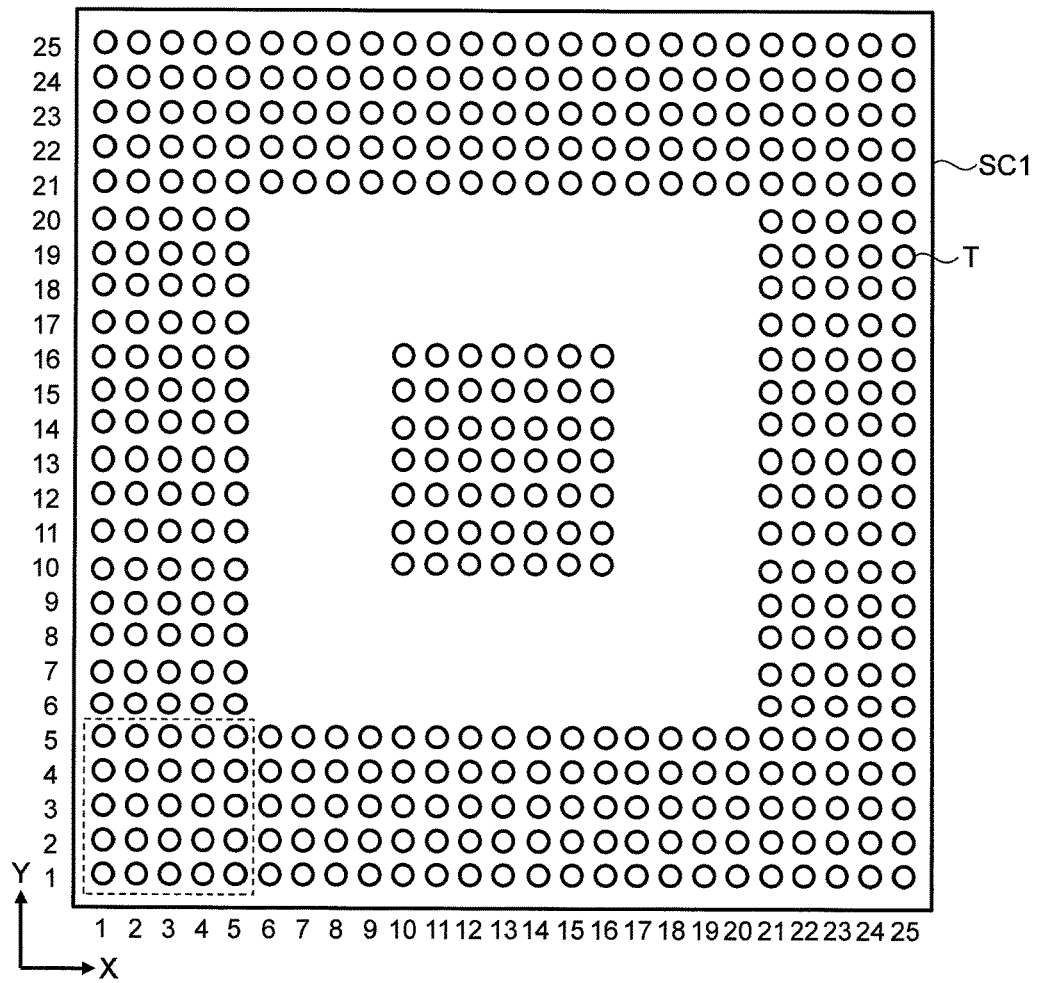
FIG. 9 is a plan view showing an example of disposition of the terminals T of the semiconductor chip SC1.

Next, referring to FIG. 9, there will be described an example of disposition of the terminals T (including the control terminals CT and the mode terminals MT) of the semiconductor chip SC1. FIG. 9 is a plan view showing an example of disposition of the terminals T of the semiconductor chip SC1. The terminals T include the control terminals CT and the mode terminals MT. In FIG. 9, the back surface of the semiconductor chip SC1 having the terminals T disposed thereon forms an x-y plane. The values described below the semiconductor chip SC1 represent x coordinates, and the values described on the left of the semiconductor chip SC1 represent y coordinates. In an example of FIG. 9, 25 terminals T are disposed in the x-axis direction, and 25 terminals T are disposed in the y-axis direction. However, no terminals T are disposed in the area of X=6 to 9 and 17 to 20 and Y=6 to 9 and 17 to 20. That is, 25×25−15×15+7×7=449 terminals T are disposed. Of course, these specific values are illustrative only.

Figure 10:
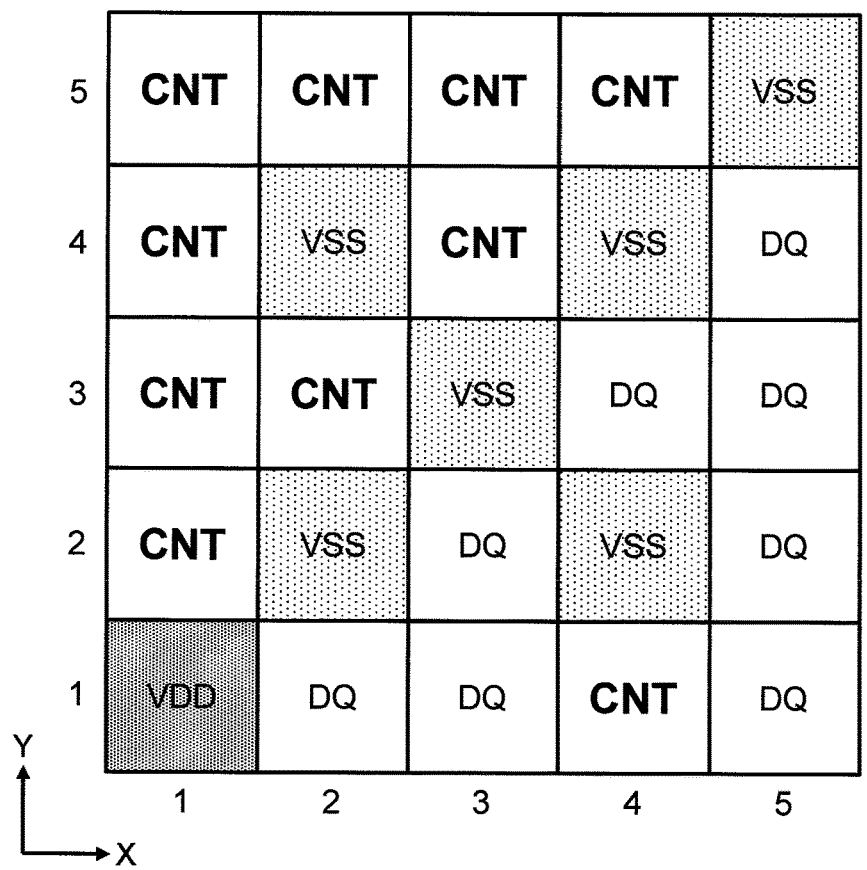
FIG. 10 is a diagram showing assignment of signals to the terminals disposed in the broken line frame (x=1 to 5 and y=1 to 5) of FIG. 9.

Next, referring to FIG. 10, assignment of signals to terminals disposed in a broken line frame (x=1 to 5 and y=1 to 5) of FIG. 9 will be described. FIG. 10 is a diagram showing assignment of signals to the terminals disposed in the broken line frame (x=1 to 5 and y=1 to 5) of FIG. 9. A total of 25 squares of x=1 to 5 and y=1 to 5 in FIG. 10 correspond to 25 terminals disposed in the broken line frame of FIG. 9 (x=1 to 5 and y=1 to 5). FIG. 10 shows that a high-potential power supply voltage signal is assigned to VDD; a low-potential power supply voltage signal to VSS; a control signal ctr2 from the memory interface MIF2 to CNT; and a data signal dq from the memory interface MIF2 to DQ.

A terminal represented by CNT in FIG. 10 is the control terminal CT coupled to the inter-chip interface ICIF through the selector SEL1 in FIG. 5. As shown in FIG. 10, at least one of a terminal for a high-potential power supply signal VDD and a terminal for a low-potential power supply signal VSS is disposed adjacent to the control terminal CT for DDR SDRAM.

Thus, the impedance of the line coupled to the control terminal CT is reduced, so that crosstalk is suppressed during memory access. As seen above, the semiconductor device SD according to the first embodiment uses the control terminal CT for DDR SDRAM as an inter-chip communication terminal. Thus, excellent inter-chip communication characteristics can be achieved.

Effects of Semiconductor Device According to First Embodiment

As seen above, in the semiconductor device SD according to the first embodiment, the semiconductor chips SC1 and SC2 are coupled together through the inter-chip interfaces ICIF included therein. Thus, either semiconductor chip can control the four monitors, 10a to 10d, and the four memories, 20a to 20d. As a result, the control is facilitated.

Further, the semiconductor device SD according to the first embodiment includes the selectors SEL1 and SEL2, which can do switching in accordance with the operation mode set by the mode terminals MT. The semiconductor device SD according to the first embodiment uses the control terminal CT, which outputs a control signal transmitted from the memory interface MIF2 in the single mode, as an inter-chip communication terminal in the inter-chip communication mode. Thus, the number of terminals is smaller than that in the third comparative example (30 in the example of FIG. 4). That is, the semiconductor device SD according to the first embodiment can perform inter-chip communication, as well as controls an increase in the number of terminals. Note that while the semiconductor device SD according to the first embodiment needs to additionally include mode terminals MT, it only has to include at most two or three mode terminals MT as described above.

Second Embodiment

Configuration of Semiconductor Device According to Second Embodiment

Figure 11:
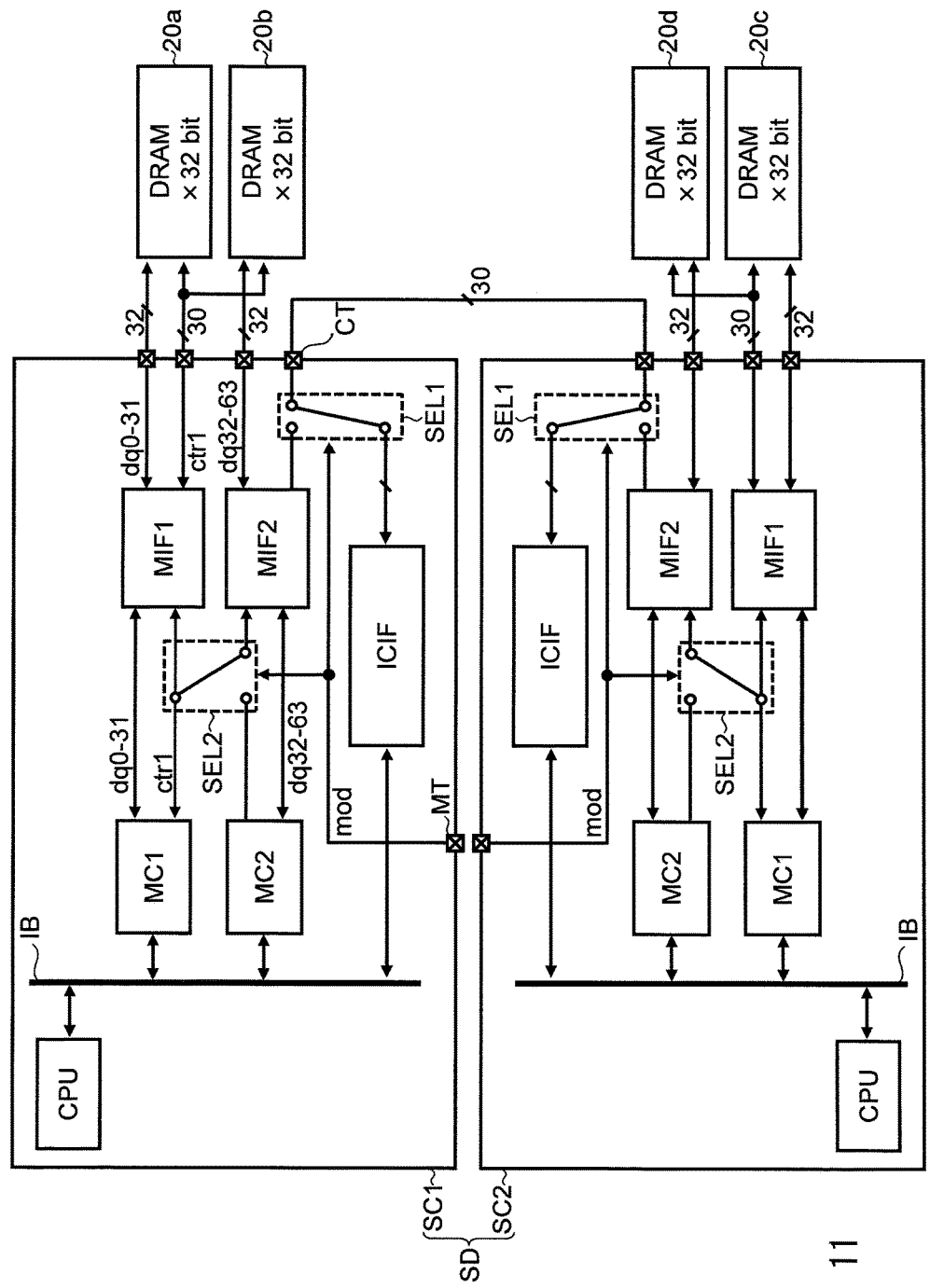
FIG. 11 is a block diagram showing an example configuration of the semiconductor device SD according to the second embodiment.

Next, referring to FIG. 11, a semiconductor device SD according to a second embodiment will be described. FIG. 11 is a block diagram showing an example configuration of the semiconductor device SD according to the second embodiment. FIG. 11 shows the internal configuration of the semiconductor device SD according to the second embodiment, as well as four memories, 20a to 20d. In an example of FIG. 11, all the memories, 20a to 20d, are 32-bit bus width DRAMs. Of course, the specific values of the bus width and the like are illustrative only and can be changed as appropriate.

As shown in FIG. 11, the semiconductor device SD according to the second embodiment includes two semiconductor chips, SC1 and SC2. Coupled to the semiconductor chip SC1 are the two monitors, 20a and 20b. Coupled to the semiconductor chip SC2 are the two memories, 20c and 20d. The semiconductor chips SC1 and SC2 are coupled together through inter-chip interfaces included therein. Thus, either semiconductor chip can control the four memories, 20a to 20b. Since the two semiconductor chips, SC1 and SC2, have similar configurations, only the semiconductor chip SC1 will be described.

As shown in FIG. 11, the semiconductor device SD according to the second embodiment does not include the graphics processing unit GPU or display control unit DC included in the semiconductor device SD shown in FIG. 5, nor is it coupled to any monitor. As seen above, the semiconductor device SD according to the second embodiment is not intended to control display of images. Rather it can be used for other purposes. For example, the semiconductor device SD according to the second embodiment can be used in electronic devices other than car navigation systems, such as mobile phones, portable game machines, tablet personal computers (PCs), and notebook PCs.

Since the semiconductor device SD according to the second embodiment has only two operation modes, the inter-chip communication mode and the single mode, it has only one mode terminal MT. Accordingly, the semiconductor device SD according to the second embodiment does not include the decoder DEC included in the semiconductor device SD shown in FIG. 5. The other configuration is similar to that of the semiconductor device SD according to the first embodiment shown in FIG. 5 and therefore will not be described.

Figure 12:
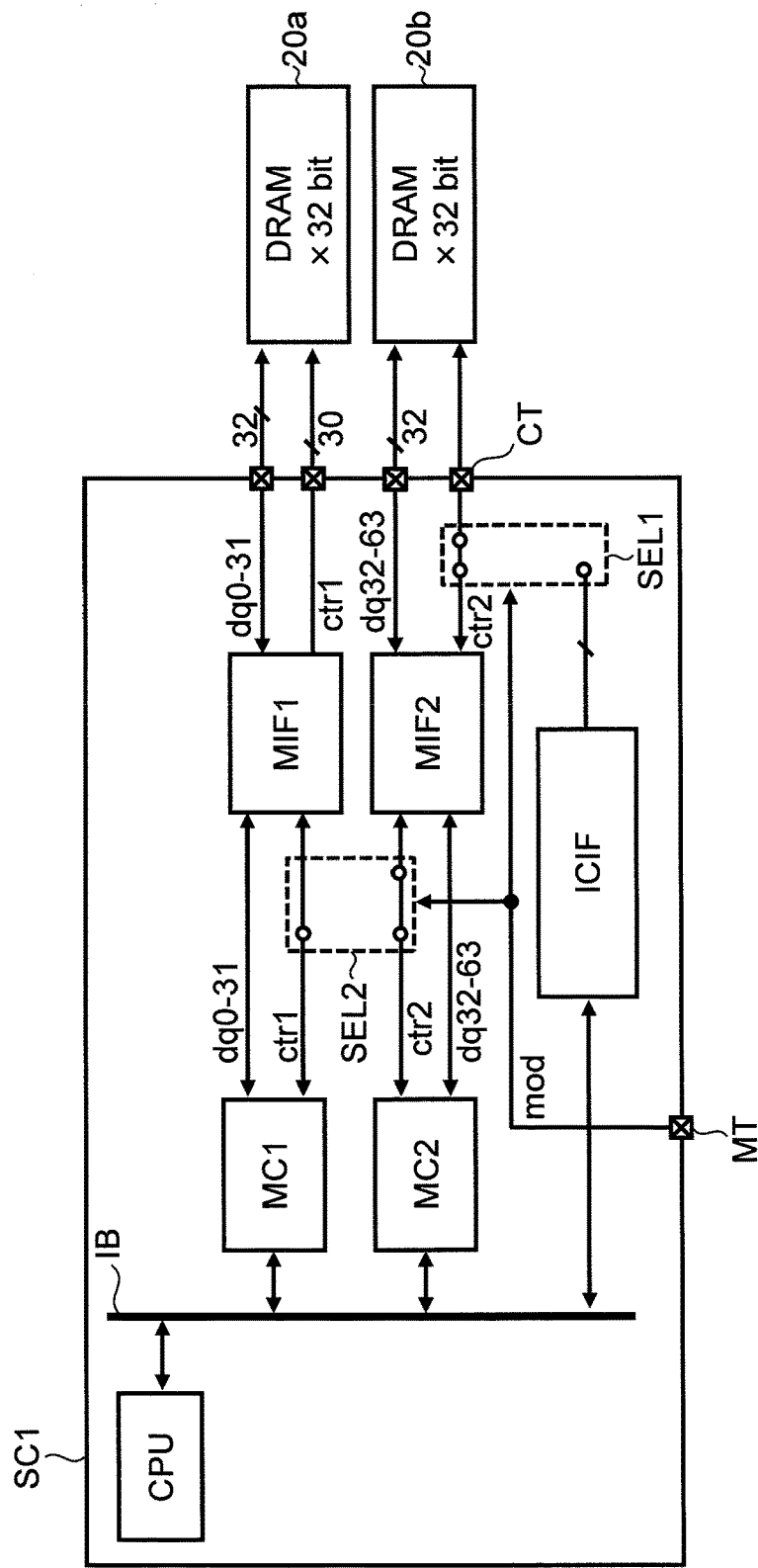
FIG. 12 is a block diagram of the semiconductor chip SC1 according to the second embodiment which is placed in the single mode.

FIG. 12 is a block diagram of the semiconductor chip SC1 according to the second embodiment which is placed in the single mode. The selections made by the selectors SEL1 and SEL2 in FIG. 12 differ from the selections made thereby in FIG. 11. Specifically, as in FIG. 11, a control signal ctr1 from the memory controller MC1 is input to the memory 20a through the memory interface MIF1. On the other hand, unlike in FIG. 11, a control signal ctr2 from the memory controller MC2 is input to the memory 20b through the memory interface MIF2. That is, the memory controller MC1 controls the memory 20a, and the memory controller MC2 controls the memory 20b.

Effects of Semiconductor Device According to Second Embodiment

As seen above, in the semiconductor device SD according to the second embodiment, the semiconductor chips SC1 and SC2 are coupled together through the inter-chip interfaces ICIF included therein. Thus, either semiconductor chip can control the four memories, 20a to 20b. Thus, the control is facilitated.

Further, the semiconductor device SD according to the second embodiment includes the selectors SEL1 and SEL2, which can do switching in accordance with the operation mode set by the mode terminal MT. The semiconductor device SD according to the second embodiment uses the control terminal CT, which outputs a control signal transmitted from the memory interface MIF2 in the single mode, as an inter-chip communication terminal in the inter-chip communication mode. Thus, the number of terminals is smaller than that in the third comparative example (30 in the example of FIG. 4). That is, as with the semiconductor device SD according to the first embodiment, the semiconductor device SD according to the second embodiment can perform inter-chip communication, as well as controls an increase in the number of terminals. Specifically, compared to the third comparative example shown in FIG. 4, the semiconductor device SD according to the second embodiment shown in FIG. 11 additionally includes one mode terminal MT but reduces 30 inter-chip communication terminals. As a result, 29 terminals can be reduced.

While the present invention has been described in detail based on the embodiments, the invention is not limited thereto. As a matter of course, various changes can be made to the embodiments without departing from the spirit and scope of the invention.

What is claimed is:

1. A semiconductor device configured to be connected to another semiconductor device and first and second memories, the semiconductor device comprising:
    first and second memory interfaces;
    a first memory controller configured to output a first control signal to be supplied to the first and second memories or to the first memory through the first memory interface and to output a first data signal to be supplied to the first memory through the first memory interface;
    a second memory controller configured to output a second control signal and a second data signal to be supplied to the second memory through the second memory interface;
    an inter-device interface for communicating with the other semiconductor device;
    an internal bus coupling together the first memory controller, the second memory controller, and the inter-device interface;
    terminals configured to be connected to the other semiconductor device, the terminals not being connected to the internal bus;
    a first selector having an end connected only to the terminals and another end configured to be selectively connected to one of the second memory interface and the inter-device interface so as to select between connecting the second memory interface to the terminals and connecting the inter-device interface to the terminals; and
    a second selector different from the first selector and having an end connected only to the second memory interface and another end configured to be selectively connected to one of the first and second memory controllers so as to select between connecting the second memory interface to the first memory controller and connecting the second memory interface to the second memory controller,
    wherein:
    the first selector is configured to select one of a first signal line connected to the second memory interface that is able to transfer a signal output from the second selector and a second signal line connected to the inter-device interface in accordance with an operation mode, and to couple the selected signal line to the terminals, and
    the second selector is configured to select one of a third signal line connected to the first memory controller that is able to transfer the first control signal and a fourth signal line connected to the second memory controller that is able to transfer the second control signal in accordance with the operation mode, and to couple the selected signal line to the second memory interface.

2. The semiconductor device according to claim 1, further comprising a mode terminal for setting the operation mode.

3. The semiconductor device according to claim 2, further comprising a decoder configured to decode a value which is set to the mode terminal.

4. The semiconductor device according to claim 1, wherein when the operation mode is a mode in which the semiconductor device communicates with the other semiconductor device,
    the first selector selects the second signal line, and the second selector selects the third signal line.

5. The semiconductor device according to claim 4, wherein when the operation mode is a mode in which the semiconductor device communicates with the other semiconductor device,
    the first memory interface outputs the first control signal to the first and second memories, and
    the second memory interface outputs the second data signal received from the second memory controller to the second memory based on the first control signal received through the second selector.

6. The semiconductor device according to claim 4, further comprising a CPU configured to access the other semiconductor device through the inter-device interface when the operation mode is a mode in which the semiconductor device communicates with the other semiconductor.

7. The semiconductor device according to claim 1, wherein when the operation mode is a mode in which the semiconductor device is used singly,
    the first selector selects the first signal line, and
    the second selector selects the fourth signal line.

8. The semiconductor device according to claim 7, wherein when the operation mode is a mode in which the semiconductor device is used singly,
    the first memory interface is configured to output the first control signal to the first memory, and
    the second memory interface is configured to output the second control signal received through the second selector to the second memory through the first selector.

9. An electronic device comprising:
    the semiconductor device according to claim 1; and
    the first and second memories configured to be connected to the semiconductor device.

10. The electronic device according to claim 9, wherein:
    the operation mode is a mode in which the semiconductor device is used singly,
    the first selector selects the first signal line, and
    the second selector selects the fourth signal line.

11. The electronic device according to claim 9, further comprising the other semiconductor device connected to the semiconductor device.

12. The electronic device according to claim 11, wherein:
    the operation mode is a mode in which the semiconductor device communicates with the other semiconductor device,
    the first selector selects the second signal line, and
    the second selector selects the third signal line.

13. The electronic device according to claim 12, further comprising a monitor coupled to the semiconductor device.

14. The electronic device according to claim 13, wherein the electronic device is a car navigation system.

* * * * *